US012714986B2

(12) United States Patent
Huang et al.

(10) Patent No.: US 12,714,986 B2
(45) Date of Patent: Aug. 25, 2026

(54) PROCESS FOR MAKING CERIUM AND ZIRCONIUM CONTAINING COMPOSITIONS USING MESITYLENE AND COMPOSITION MADE BY SAME

(71) Applicant: Neo Performance Materials (Singapore) Pte. Ltd., Singapore (SG)

(72) Inventors: Barry Huang, Singapore (SG); Steffi Tan, Singapore (SG); Szu Hwee Ng, Singapore (SG)

(73) Assignee: NEO Performance Materials (Singapore) PTE, LTD., Singapore (SG)

( * ) Notice: Subject to any disclaimer, the term of this patent is extended or adjusted under 35 U.S.C. 154(b) by 702 days.

(21) Appl. No.: 17/798,237

(22) PCT Filed: Feb. 12, 2021

(86) PCT No.: PCT/IB2021/000099
§ 371 (c)(1),
(2) Date: Aug. 8, 2022

(87) PCT Pub. No.: WO2021/161108
PCT Pub. Date: Aug. 19, 2021

(65) Prior Publication Data
US 2023/0129838 A1 Apr. 27, 2023

Related U.S. Application Data

(60) Provisional application No. 62/976,927, filed on Feb. 14, 2020.

(51) Int. Cl.
*B01J 23/10* (2006.01)
*B01J 21/06* (2006.01)
(Continued)

(52) U.S. Cl.
CPC ............ *B01J 23/10* (2013.01); *B01J 21/066* (2013.01); *B01J 35/613* (2024.01); *B01J 35/657* (2024.01);
(Continued)

(58) Field of Classification Search
CPC ........ B01J 23/10; B01J 21/066; B01J 35/613; B01J 35/657; B01J 37/0236; B01J 37/031;
(Continued)

(56) References Cited

U.S. PATENT DOCUMENTS 10,472,290 B2 11/2019 Goto et al.
2013/0052108 A1 2/2013 Ifrah et al.
(Continued)

FOREIGN PATENT DOCUMENTS

CN 102247826 A 11/2011
CN 109414689 A 3/2019
(Continued)

OTHER PUBLICATIONS

Anyaba (Novel Techniques for The Synthesis of Three-Way Catalytic Converter Support Materials, Clemson University, 2009) (Year: 2009).*
(Continued)

*Primary Examiner* — Richard M Rump
*Assistant Examiner* — Logan Laclair
(74) *Attorney, Agent, or Firm* — Melissa M. Hayworth; E. Joseph Gess; Merchant & Gould, P.C.

(57) ABSTRACT

Disclosed herein are catalyst compositions having improved mercury intrusion volume and surface areas and processes for making these compositions. The enhanced compositions disclosed herein contain zirconium, cerium, optionally yttrium, and optionally one or more rare earths other than cerium and yttrium. Further disclosed are processes of
(Continued)

producing these compositions involving supercritical drying after addition of mesitylene. The compositions can be used as a catalyst and/or as part of a catalyst system in an automobile exhaust system.

11 Claims, 3 Drawing Sheets

(51) Int. Cl.
*B01J 35/61* (2024.01)
*B01J 35/64* (2024.01)
*B01J 37/02* (2006.01)
*B01J 37/03* (2006.01)
*B01J 37/08* (2006.01)

(52) U.S. Cl.
CPC ......... *B01J 37/0236* (2013.01); *B01J 37/031* (2013.01); *B01J 37/08* (2013.01); *B01J 2523/3712* (2013.01); *B01J 2523/48* (2013.01)

(58) Field of Classification Search
CPC ......................... B01J 37/08; B01J 2523/3712; B01J 2523/48; B01J 35/638; B01J 2523/00; B01J 23/002; B01J 37/0018; B01J 37/033; B01J 37/086; B01J 37/088; C01G 25/00; C01G 25/006; C01P 2006/12; C01P 2006/13; C01P 2006/14
See application file for complete search history.

(56) References Cited

U.S. PATENT DOCUMENTS

2014/0205522 A1 7/2014 Ifrah et al.
2014/0221200 A1 8/2014 Schoneborn et al.
2017/0027435 A1 2/2017 Boutinon et al.
2017/0274355 A1* 9/2017 Psaras ...................... B01J 35/66
2019/0144342 A1 5/2019 Goto et al.
2020/0188885 A1 6/2020 Itani et al.
2022/0297091 A1 9/2022 Ifrah et al.
2023/0083341 A1 3/2023 Huang et al.
2023/0094402 A1 3/2023 Huang et al.
2023/0149906 A1 5/2023 Huang et al.

FOREIGN PATENT DOCUMENTS

CN 114144380 A 3/2022
EP 0628515 A1 12/1994
EP 3045227 A1 7/2016
WO 98/45212 A1 10/1998
WO 2011083157 A1 7/2011
WO 2012171947 A1 12/2012
WO 2013007242 A1 1/2013
WO 2016/037059 A1 3/2016
WO 2017185224 A1 11/2017
WO 2018115436 A1 6/2018
WO 2021013016 A1 1/2021

OTHER PUBLICATIONS

Wang et al. (Synthesis of La modified ceria-zirconia solid solution by advanced supercritical ethanol drying technology and its application in Pd-only three-way catalyst, Applied Catalysis B: Environmental, 2010) (Year: 2010).*
Jana et al. (Pore size control of mesoporous molecular sieves using different organic auxiliary chemicals, Microporous and Mesoporous Materials, 2004) (Year: 2004).*
Sahin et al. (Kinetics of Supercritical Drying of Gels, Gels, 2017) (Year: 2017).*
Anyaba, Prince Nwabueze, “Novel Techniques for The Synthesis of Three-Way Catalytic Converter Support Materials”, Clemson University Dissertation, Chemical Engineering Commons, Jan. 1, 2009, pp. 25-29 from Chapter. III. https://tigerprints.clemson.edu/all_dissertations.
Database WPI Week 201264; Thomson Scientific, London, GB AN 2011-Q20068; XP002803437.
Anyaba Prince Nwabueze, “Novel Techniques for The Synthesis of Three-Way Catalytic Converter Support Materials”, Dissertation, Jan. 1, 2009, pp. 25-29; https://tigerprints.clemson.edu/cgi/viewconttent.cgi?article=1428&context-all_dissertations; p. 27, paragraph 2, fig 3,4.
International Search Report and Written Opinion mailed Jul. 6, 2021 in PCT/IB2021/000099.

* cited by examiner

PROCESS FOR MAKING CERIUM AND ZIRCONIUM CONTAINING COMPOSITIONS USING MESITYLENE AND COMPOSITION MADE BY SAME

RELATED APPLICATIONS

The present application is a U.S. National Stage filing under 35 U.S.C. § 371 of International Application No. PCT/IB2021/000099 filed 12 Feb. 2021, which claims priority to U.S. Application No. 62/976,927 filed 14 Feb. 2020.

This application relates to compositions having improved mercury intrusion volumes and surface areas and processes for making these compositions. The enhanced compositions disclosed herein contain zirconium, cerium, optionally yttrium, and optionally one or more rare earths other than cerium and yttrium. In particular, the processes for making these compositions utilize mesitylene within the process.

INTRODUCTION

Cerium and zirconium oxide ($CeO_2$—$ZrO_2$) based materials have been used in catalytic applications. Introduction of zirconium into the cerium (IV) oxide lattice or cerium into the zirconium oxide lattice greatly enhances and facilitates oxygen mobility. This fact has been readily adapted by the automotive pollution control catalyst industry where cerium and zirconium oxide ($CeO_2$—$ZrO_2$) containing materials are ubiquitous in use as washcoat components. These materials catalyze oxidation of carbon monoxide and hydrocarbons and reduction of nitrogen oxides as shown in the below equations:

$$2CO+O_2 \rightarrow 2CO_2$$

$$C_xH_{2x+2}+[(3x+1)/2]O_2 \rightarrow xCO_2+(x+1)H_2O$$

$$2NO+2CO \rightarrow 2CO_2+N_2$$

Cerium and zirconium oxide ($CeO_2$—$ZrO_2$) based materials also have been used in catalytic applications as supports to disperse active metal catalysts so as to enhance the activity of the catalyst resulting in high turn-over numbers. To this, the support plays a major role in maintaining the active metal catalyst's high dispersion state even at severe operating conditions such as high temperatures and hydrothermal environments. A support that fails to maintain its structural integrity under severe conditions may result in the occlusion or sintering of the active catalyst metal sites which results in diminished activity of the catalyst on a per molecule basis. Since many of these catalysts utilize expensive precious metals, such as platinum, palladium and/or rhodium, loss of catalyst metal activity directly impacts the cost of such catalysts requiring the use of increased precious metal loadings in order to maintain the desired catalyst activity. Parallel to this, the use of a structurally stable support allows for reduced precious metal use whilst maintaining or improving catalyst activity.

A variety of synthesis methods for the production of the cerium and zirconium oxide ($CeO_2$—$ZrO_2$) based materials also have been reported.

It is an object of the present application to provide cerium and zirconium based materials with excellent characteristics useful in catalysis and processes for providing these materials. That is, as a catalyst/catalyst support having a high surface area, a stable surface under oxidizing, reducing and hydrothermal and redox conditions, with stable crystallographic characteristics under severe aging conditions, high and stable mercury intrusion volume, with selective porosity/mercury intrusion volume, with high activity at lower temperatures and with low mass transfer resistance and high dynamic oxygen storage and release characteristics.

SUMMARY

As disclosed herein, the present compositions comprise zirconium, cerium, optionally yttrium, and optionally one or more rare earths other than cerium and yttrium.

In some embodiments, these compositions have a total mercury intrusion volume of from about 1.6 to about 4.0 cc/g after calcination at 1000 degrees Celsius for 10 hours in an oxidizing environment. These compositions also can have a surface area of about 50 $m^2/g$ to about 100 $m^2/g$ after calcination at 1000 degrees Celsius for a period of 10 hours in an oxidizing environment. In certain of these embodiments, the compositions further have a surface area of about 20 $m^2/g$ to about 85 $m^2/g$ after calcination at 1100 degrees Celsius for a period of 10 hours in an oxidizing environment and in some embodiments, the compositions further have a total mercury intrusion volume of from about 1.0 to about 3.0 cc/g after calcination at 1100 degrees Celsius for 10 hours in an oxidizing environment.

In certain embodiments, these compositions have a total mercury intrusion volume of from about 2.0 to about 3.5 cc/g after calcination at 1000 degrees Celsius for 10 hours in an oxidizing environment and a total mercury intrusion volume of from about 1.0 to about 2.0 cc/g after calcination at 1100 degrees Celsius for 10 hours in an oxidizing environment. These compositions further can have a surface area of about 50 $m^2/g$ to about 70 $m^2/g$ after calcination at 1000 degrees Celsius for a period of 10 hours in an oxidizing environment and about 20 $m^2/g$ to about 35 $m^2/g$ after calcination at 1100 degrees Celsius for a period of 10 hours in an oxidizing environment.

Further disclosed herein is a process of producing a composition comprising zirconium, cerium, optionally yttrium and optionally one or more rare earths other than cerium and yttrium. The process comprises the steps of (a) mixing Zr and Ce salt solutions to provide a mixture; (b) adding the mixture to basic solution to form a precipitate; (c) dewatering the precipitate; (d) adding mesitylene to the precipitate; (e) supercritically drying the precipitate; and (f) calcining the precipitate to provide a composition comprising zirconium, cerium, optionally yttrium, and optionally one or more rare earths other than cerium and yttrium. The process further can include the step of washing the precipitate with water before dewatering the precipitate. The process also can include mixing rare earth solutions other than cerium and yttrium in step (a) and further mixing a yttrium solution in step (a) to provide the mixture. The compositions made by these processes have desirable mercury intrusion volumes and surfaces areas, Compositions made by this process are disclosed and as described above.

The disclosed compositions can be used in catalysts for purifying exhaust gases or catalyst supports to improve heat resistance and catalyst activity when used with precious metal. These disclosed cerium and zirconium oxide ($CeO_2$—$ZrO_2$) based materials possess high surface areas that have stable surfaces when subjected to severe aging conditions, such as under high temperature air, hydrothermal and redox conditions. They also possess stable crystallographic characteristics under severe aging conditions, high, stable, and selective mercury intrusion volumes, with high redox activities at lower temperatures and with low mass transfer resistance and high dynamic oxygen storage and release characteristics.

DETAILED DESCRIPTION

Figure 1:
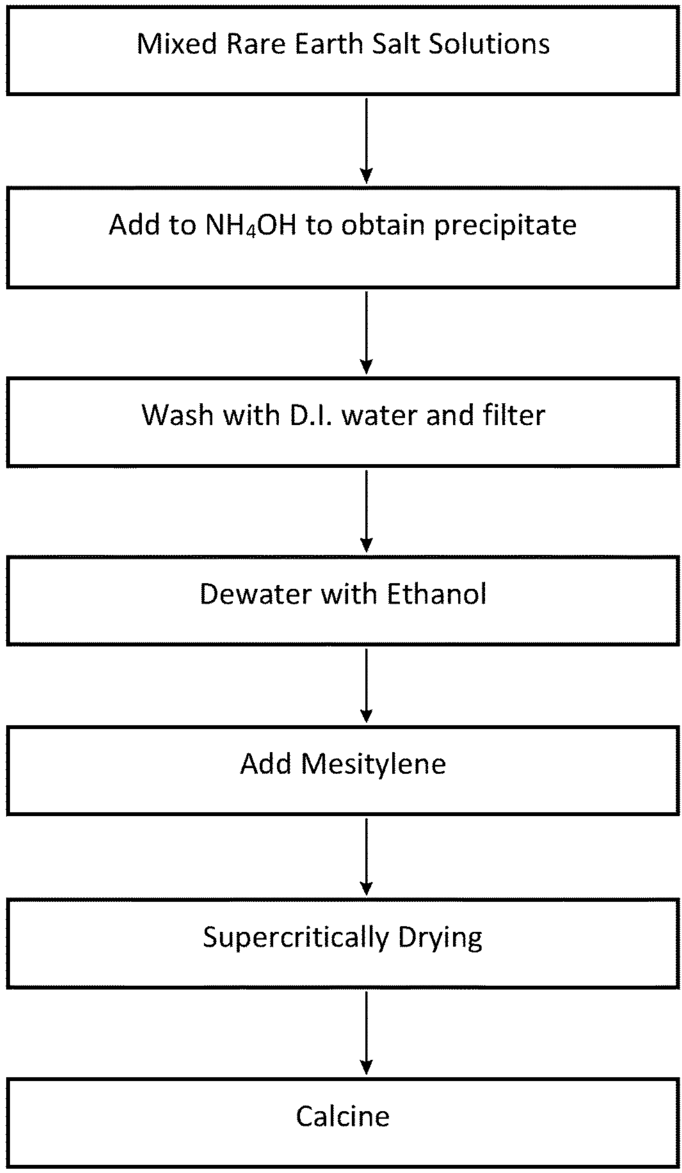
FIG. 1 illustrates a flowchart of an embodiment of the experimental process of making high porosity cerium and zirconium with mesitylene added to the process as disclosed and described herein.

Before the compositions having improved mercury intrusion volumes and surface areas and processes are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a step" may include multiple steps, reference to "producing" or "products" of a reaction or treatment should not be taken to be all of the products of a reaction/treatment, and reference to "treating" may include reference to one or more of such treatment steps. As such, the step of treating can include multiple or repeated treatment of similar materials/streams to produce identified treatment products.

Numerical values with "about" include typical experimental variances. As used herein, the term "about" means within a statistically meaningful range of a value, such as a stated particle size, concentration range, time frame, molecular weight, temperature, or pH. Such a range can be within an order of magnitude, typically within 10%, and even more typically within 5% of the indicated value or range. Sometimes, such a range can be within the experimental error typical of standard methods used for the measurement and/or determination of a given value or range. The allowable variation encompassed by the term "about" will depend upon the particular system under study, and can be readily appreciated by one of ordinary skill in the art. Whenever a range is recited within this application, every whole number integer within the range is also contemplated as an embodiment of the invention.

The present application relates to compositions having excellent mercury intrusion volumes and high surface areas after calcination. These compositions have advantageous properties for use as catalysts and/or catalyst components. The present application also relates to processes for preparing these compositions and compositions specifically prepared by the disclosed processes.

As recited herein, mercury intrusion volume is determined using a Micromeritics Auto Pore IV mercury porosimeter using the following procedure: A powder sample was accurately weighed to 4 significant figures, and was then evacuated to 50 μm Hg in the machine sample holder. It was then subjected to mercury pressure (by the machine) with a filling pressure step of 0.5 psia. The dwell time at each step was 10 seconds. For the required conversion of pressure to pore entrance diameter, the value for mercury surface tension used was 485 dynes/cm and the contact angle used was 130°. The mercury intrusion volume was the integral of mercury intrusion volume into the sample at each pressure step.

The mercury intrusion volume is associated with porosity and pore structure of catalyst/catalyst supports comprising cerium and zirconium. Regardless of the catalyst site activity, facile molecular transport of reactants to the active site and transport of reaction products away from the active site making it available for further reaction is of great importance. In situations where catalyst selectivity is of no consideration, a wide and open pore structure of the support is desirable. In situations where selectivity of the reacting molecules or products is desired, an engineered porosity allowing only the desired reactants to reach the active site and only the desired products allowed to leave the active site, is needed. For example, this type of function is well known and utilized with zeolitic materials. Therefore, materials with a particular mercury intrusion volume are beneficial depending on the types of desired reactions.

As disclosed herein, the compositions comprise zirconium, cerium, optionally yttrium, and optionally one or more rare earths other than cerium and yttrium. These compositions have a total mercury intrusion volume of from about 1.6 to about 4.0 cc/g after calcination at 1000 degrees Celsius for 10 hours in an oxidizing environment.

In some embodiments, the compositions have a total mercury intrusion volume of from about 1.8 to about 4.0 cc/g after calcination at 1000 degrees Celsius for 10 hours in an oxidizing environment. In certain embodiments, these compositions have a total mercury intrusion volume of from about 2.0 to about 3.5 cc/g, and in other embodiments about 2.0 to about 3.0 cc/g, both after calcination at 1000 degrees Celsius for 10 hours in an oxidizing environment. In yet other embodiments, these compositions have a total mercury intrusion volume of from about 2.4 to about 2.6 cc/g after calcination at 1000 degrees Celsius for 10 hours in an oxidizing environment.

In any of these embodiments, the compositions also can have a total mercury intrusion volume of about 1.0 to about 3.0 cc/g, after calcination at 1100 degrees Celsius for 10 hours in an oxidizing environment. In certain embodiments, these compositions can have a total mercury intrusion volume of from about 1.0 to about 2.0 cc/g, and in some embodiments about 1.25 to about 2.0 cc/g, both after calcination at 1100 degrees Celsius for 10 hours in an oxidizing environment. In yet other embodiments, the compositions also can have a total mercury intrusion volume of about 1.3 to about 1.7 cc/g, after calcination at 1100 degrees Celsius for 10 hours in an oxidizing environment.

These compositions further have a surface area of about 50 $m^2/g$ to about 100 $m^2/g$ after calcination at 1000 degrees Celsius for a period of 10 hours in an oxidizing environment. In certain embodiments, these compositions can have a surface area of about 50 $m^2/g$ to about 70 $m^2/g$, and in other embodiments 55 $m^2/g$ to about 65 $m^2/g$, both after calcination at 1000 degrees Celsius for a period of 10 hours in an oxidizing environment.

In certain of these embodiments, the compositions also can have a surface area of about 20 $m^2/g$ to about 85 $m^2/g$ after calcination at 1100 degrees Celsius for a period of 10 hours in an oxidizing environment. In some of these embodiments, the composition can have a surface area of about 20 $m^2/g$ to about 35 $m^2/g$, and in other embodiments about 25 $m^2/g$ to about 30 $m^2/g$, both after calcination at 1100 degrees Celsius for a period of 10 hours in an oxidizing environment.

The above-recited mercury intrusion volumes after calcination at 1000 and 1100 degrees Celsius for 10 hours in an oxidizing environment may be combined in any combination and further may be combined in any combination with the above-recited surface areas after calcination at 1000 and 1100 degrees Celsius for a period of 10 hours in an oxidizing environment. The above-recited surface areas after calcination at 1000 and 1100 degrees Celsius for 10 hours in an oxidizing environment may be combined in any combination and further may be combined in any combination with the above-recited mercury intrusion volumes after calcination at 1000 and 1100 degrees Celsius for a period of 10 hours in an oxidizing environment.

The apparent surface area of the compositions was determined by using a Micromeritics ASAP 2000 system and nitrogen at about 77 Kelvin. The procedure outlined in ASTM International test method D 3663-03 (Reapproved 2008) was used but with one significant exception. It is well known that a "BET Surface Area" determination is not possible for materials that contain microporosity. Recognizing that the surface area is an approximation, the values reported are labeled "apparent surface area" values rather than "BET surface area" values. In compliance with commonly accepted procedures, the determination of apparent surface area, the application of the BET equation was limited to the pressure range where the term na(1−P/Po) of the equation continuously increases with P/Po. The out gassing of the sample was done under nitrogen at about 300 degrees Celsius for about 2 hours.

Surface area of a catalyst is directly proportional to the number of active sites for conversion of exhaust gas molecules. For catalyst supports, high surface area also leads to high dispersion active metal catalysts, which enhances the catalytic activity resulting in high turn-over numbers. To this, heat resistance of the support plays a major role in maintaining the active metal catalyst's high dispersion state, even at severe operating conditions, such as high temperatures and hydrothermal environments. A support that fails to maintain its structural integrity under severe conditions may result in the occlusion or sintering of the active catalyst metal sites which results in diminished activity of the catalyst on a per molecule basis. By providing such high and thermally stable surface area, the metal's activity, as well as the active support's functionality, are greatly enhanced.

In certain embodiments relating to surface area as defined above, the compositions also have a total mercury intrusion volume of from about 2.4 to about 2.6 cc/g after calcination at 1000 degrees Celsius for 10 hours in an oxidizing environment.

In some of these embodiments, the compositions also have as a total mercury intrusion volume of from about 1.3 to about 1.7 cc/g after calcination at 1100 degrees Celsius for 10 hours in an oxidizing environment.

In some embodiments, the compositions having any of the mercury intrusion volumes as set forth above also have a surface area of about 55 $m^2/g$ to about 62 $m^2/g$ after calcination at 1000 degrees Celsius for a period of 10 hours in an oxidizing environment.

In some of these embodiments, the compositions further have a surface area of about 25 $m^2/g$ to about 30 $m^2/g$ after calcination at 1100 degrees Celsius for a period of 10 hours in an oxidizing environment.

The compositions as disclosed herein are made by the processes disclosed herein utilizing mesitylene. These compositions may have a total mercury intrusion volume of about 15% to about 80% greater, or about 15% to about 70% greater, after calcination at 1000 degrees Celsius for 10 hours in an oxidizing environment in comparison to compositions made by the same process but not utilizing mesitylene. These compositions may also have a total mercury intrusion volume of about 8% to about 45% greater, or about 8% to about 35% greater, after calcination at 1100 degrees Celsius for 10 hours in an oxidizing environment in comparison to compositions made by the same process but not utilizing mesitylene.

In certain of these embodiments, the compositions made by the processes disclosed herein utilizing mesitylene have a surface area of about 5% to 45% greater, or about 5% to 25% greater, after calcination at 1000 degrees Celsius for a period of 10 hours in an oxidizing environment in comparison to compositions made by the same process but not utilizing mesitylene. The compositions further may also have a surface area of about 5% to 30% greater, or about 5% to 25% greater, after calcination at 1100 degrees Celsius for a period of 10 hours in an oxidizing environment in comparison to compositions made by the same process but not utilizing mesitylene.

In these compositions, the molecular ratio of Zr/Ce is greater than 50%. The ratio of Zr to Ce (Zr:Ce) in the composition is about 1:1 to about 4:1, and in certain embodiments about 1:1 to about 2:1. In certain embodiments of these compositions, any additional components (e.g., yttrium, and rare earths other than cerium) are present in an amount of 0 to 30% weight oxide based.

In certain these compositions, the equivalent oxide weight ratio of $CeO_2/ZrO_2/La_2O_3/Y_2O_3$ can be 45/45/5/5. In other of these compositions, the ratio of $CeO_2/ZrO_2/La_2O_3/Nd_2O_3/Pr_6O_{11}$ can be 40/50/2/4/4. In other of these compositions, the ratio of $CeO_2/ZrO_2/La_2O_3/Nd_2O_3$ can be 20.8/72.2/1.7/5.3.

In certain of these compositions, the ratio of $CeO_2/ZrO_2/La_2O_3/Y_2O_3$ can be approximately 20-55 wt %/35-75 wt %/1-8 wt %/1-8 wt %. In one example embodiment of these compositions, the ratio of $CeO_2/ZrO_2/La_2O_3/Y_2O_3$ can be approximately 45 wt %/45 wt %/5 wt %/5 wt %. In other of these compositions, the ratio of $CeO_2/ZrO_2/La_2O_3/Nd_2O_3/Pr_6O_{11}$ can be 40 wt %/50 wt %/2 wt %/4 wt %/4 wt %. In other of these compositions, the ratio of $CeO_2/ZrO_2/La_2O_3/Nd_2O_3$ can be 20.8 wt %/72.2 wt %/1.7 wt %/5.3 wt %. All compositions are referenced on an oxide equivalent basis.

The compositions as disclosed herein are made by a process comprising: (a) mixing Zr and Ce solutions to provide a mixture; (b) adding the mixture to a basic solution to form a precipitate; (c) dewatering the precipitate; (d) adding mesitylene to the precipitate; (e) supercritical drying the precipitate; and (f) calcining the precipitate to provide a composition comprising zirconium, cerium, optionally one or more rare earths other than cerium, and optionally yttrium.

Compositions made by this process exhibit a total mercury intrusion volume as described herein. For example, these compositions have a total mercury intrusion volume of from about 1.6 to about 4.0 cc/g after calcination at 1000 degrees Celsius for 10 hours in an oxidizing environment. These compositions also can exhibit a surface area of about 50 $m^2/g$ to about 100 $m^2/g$ after calcination at 1000 degrees Celsius for a period of 10 hours in an oxidizing environment. In some embodiments, these compositions also exhibit a surface area of about 20 $m^2/g$ to about 85 $m^2/g$ after calcination at 1100 degrees Celsius for a period of 10 hours in an oxidizing environment and a total mercury intrusion volume of from about 1.0 to about 3.0 cc/g after calcination at 1100 degrees Celsius for 10 hours in an oxidizing environment.

In certain embodiments, the compositions have a total mercury intrusion volume of from about 2.0 to about 3.5 cc/g, and in other embodiments about 2.0 to about 3.0 cc/g, both after calcination at 1000 degrees Celsius for 10 hours in an oxidizing environment. These compositions also may have a total mercury intrusion volume of from about 1.0 to about 2.0 cc/g, and in other embodiments about 1.25 to about 2.0 cc/g, both after calcination at 1100 degrees Celsius for 10 hours in an oxidizing environment.

In certain of the above embodiments, these compositions have a surface area of about 50 $m^2/g$ to about 70 $m^2/g$, and in other embodiments 55 $m^2/g$ to about 65 $m^2/g$, both after calcination at 1000 degrees Celsius for a period of 10 hours in an oxidizing environment. These compositions also may have a surface area of about 20 $m^2/g$ to about 35 $m^2/g$, and in other embodiments about 25 $m^2/g$ to about 30 $m^2/g$, both after calcination at 1100 degrees Celsius for a period of 10 hours in an oxidizing environment.

In the processes as disclosed herein, the mesitylene can be added in an amount of approximately 50-100% by weight with respect to oxide in the precipitate.

In the process as disclosed herein, the supercritical drying can be conducted at approximately 250-350° C. and approximately 130-140 bars.

In the process as disclosed herein, the calcining can conducted at a temperature ranging from about 400° C. to 1100° C. and for from about 0.25 to 24 hours. In some embodiments, the calcining can be conducted at a temperature ranging from about 850° C. to 1000° C. and for about 3 to 7 hours, and in certain embodiments at a temperature of about 900° C. and for about 5 hours.

Calcining can be conducted in an oxidizing atmosphere, in an inert environment, or in a reducing atmosphere. If calcining is conducted in an inert or reducing environment, it may be followed by treatment in an oxidizing environment.

The starting rare earth salts are water soluble and in the process as disclosed herein can be dissolved in water. The rare earth salts can be nitrates, chlorides, and the like. The cerium salt can be of Ce(III) or Ce(IV) oxidation state.

The order of addition of the rare earths and the basic solution is not important and any order of addition may be utilized or all may be added together simultaneously. Further, the rate of addition is not important. The basic solution can be ammonia, sodium hydroxide, and the like.

The precipitate may be washed to achieve a selected conductivity before calcining. In some embodiments this desired conductivity is about 6-8 mS/cm. In some embodiments, the precipitate is washed with water before the dewatering step.

The dewatering step may be performed with any suitable alcohol, for example, isopropanol or ethanol. In some embodiments, the precipitate is dewatered with ethanol.

The calcining process provides the compositions as disclosed herein. Calcining can be conducted in any appropriate furnace and environment including, but not limited to, oxidizing, reducing, hydrothermal, or inert. In some embodiments, an oxidizing environment is preferred. A tubular furnace can be used. By virtue of its tubular design, a tube furnace allows better gas flow for more thorough treatment.

FIG. 1 is a flow chart for an embodiment of the process of making the compositions as disclosed herein.

Figures 2A, 2B, 2C, 2D, 2E, 2F:
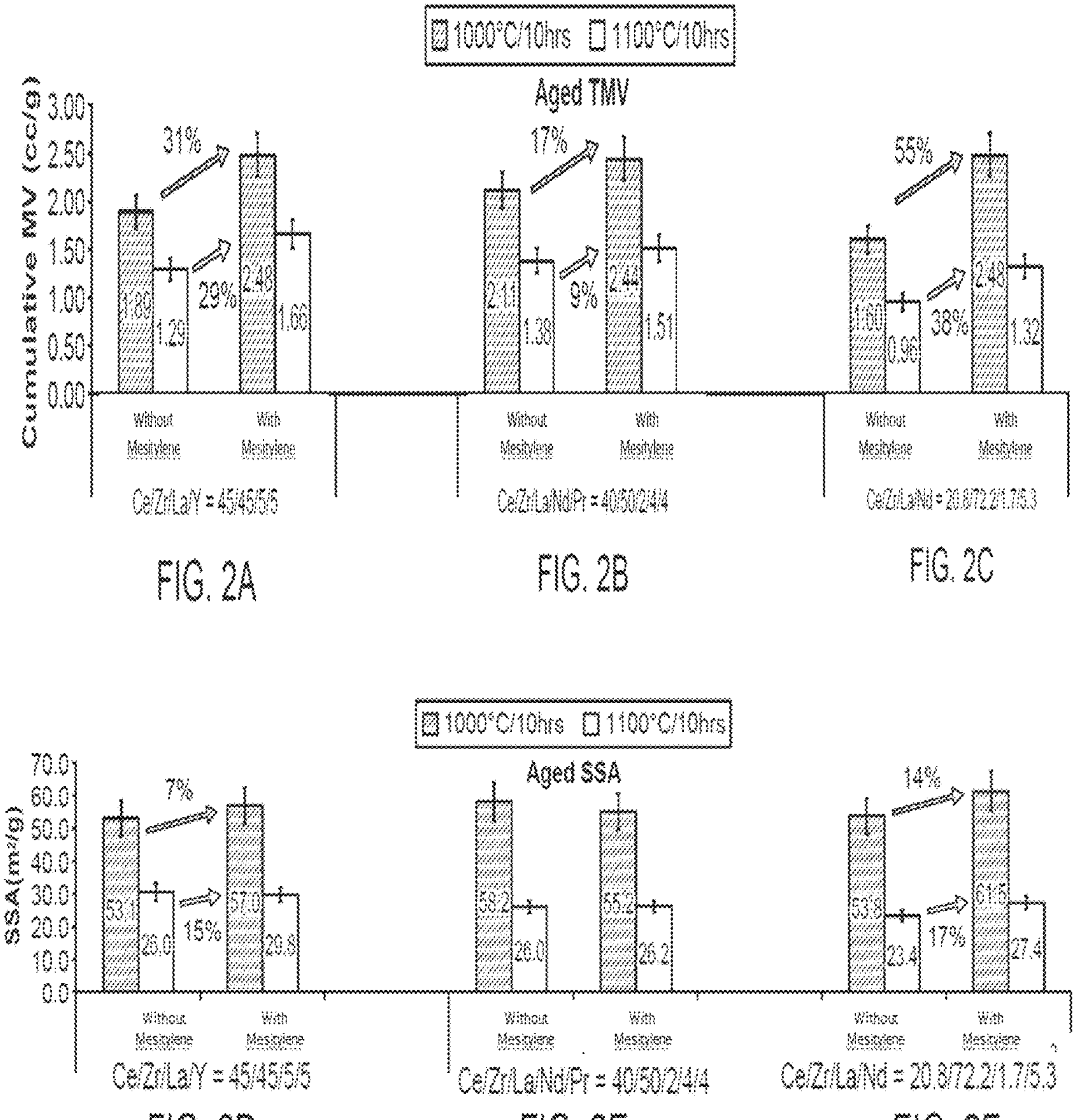
FIG. 2A-2C are graphs showing the difference in cumulative mercury intrusion volume of various cerium and zirconium compositions made by a prior art process in comparison to the process as disclosed herein using mesitylene after aging at 1000° C. for 10 hours in an oxidizing environment and after aging at 1100° C. for 10 hours in an oxidizing environment. Components listed in oxide equivalent ratios.
FIGS. 2D-2F are graphs showing the difference in aged surface areas of various cerium and zirconium compositions made by a prior art process in comparison to the process as disclosed herein using mesitylene after aging at 1000° C. for 10 hours in an oxidizing environment and after aging at 1100° C. for 10 hours in an oxidizing environment. Components listed in oxide equivalent ratios.

The compositions as disclosed herein were made and tested for aged total mercury intrusion volume and specific surface areas and compared to similar compositions made according to a prior art process not using mesitylene. The compositions as disclosed herein and made by the processes disclosed herein exhibit improved cumulative mercury intrusion volume (FIGS. 2A-2C) and improved specific surface area (SSA) (FIGS. 2D-2F).

Figures 3A, 3B:
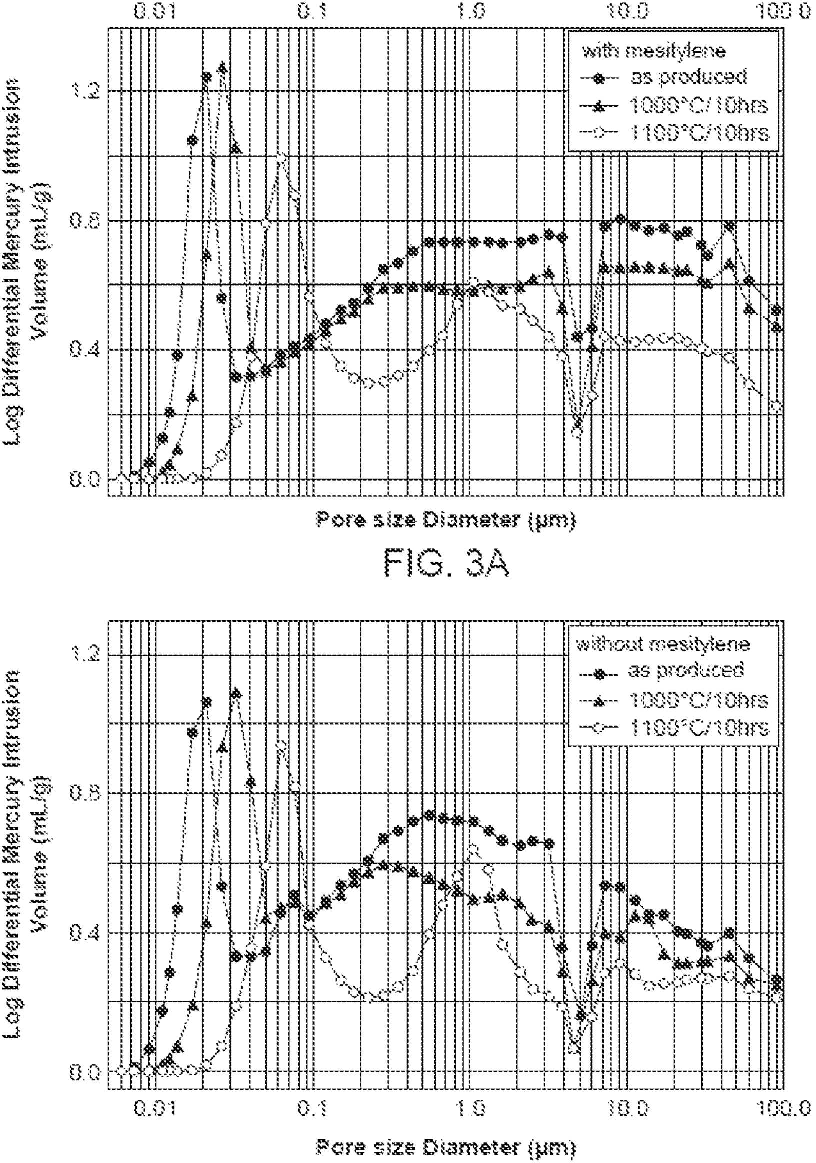
FIGS. 3A and 3B are graphs showing the typical increased mercury intrusion volume, of various cerium and zirconium compositions made by a prior art process in comparison to the process as disclosed herein using mesitylene for "as-produced" and after aging at 1000° C. for 10 hours in an oxidizing environment and after aging at 1100° C. for 10 hours in an oxidizing environment.

In compositions as disclosed herein exhibit an increased mercury intrusion volume in comparison to similar compositions made according to a prior art process not using mesitylene (See FIGS. 3A and 3B).

Example: Synthesis of $CeO_2/ZrO_2/La_2O_3/Nd_2O_3/Pr_6O_{11}$

The following was done:

1) A Ce/Zr/La/Nd/Pr nitrate precursor solution with appropriate cation ratios was prepared with the oxide equivalent content of 100 g/L. The cerium used is of the ceric ammonium nitrate form.
2) An aqueous ammonium solution was prepared $NH_4OH$ (4.5M, $NH_4OH/M=10.1$)
3) The aqueous ammonia and the Ce/Zr/La/Nd/Pr nitrate solutions were combined to provide a precipitate.
4) The precipitates were washed with deionized water to a conductivity of 6-8 mS/cm. The solids were recovered by vacuum filtration.
5) The solids were dewatered with ethanol.
6) Mesitylene was added (50-200 wt %) with respect to the oxide equivalent content of the solids).
7) The washed precipitates were subjected to supercritical drying at 300° C. and 130-140 bar.
8) The dried solids were calcined at 900° C. for five hours.

Example: Incorporating $CeO_2/ZrO_2/La_2O_3/Nd_2O_3/Pr_6O_{11}$ Composition into a Catalyst or Catalyst Support The mixed oxide materials comprising cerium and zirconium as described herein can be utilized as major components in a catalyst or catalyst support to be incorporated into automobile exhaust system. Introduction of zirconium into the cerium (IV) oxide lattice or cerium into the zirconium oxide lattice greatly enhances and facilitates oxygen mobility. Also, doping these cerium and zirconium oxide ($CeO_2$—$ZrO_2$) solid solution with other rare earths such as La, Nd, Pr and Y further improves catalytic activity and heat resistance. These mixed oxide materials as disclosed herein possess high surface areas that are thermally stable when subjected to severe aging conditions such as under high temperature air, hydrothermal and redox conditions. They also possess stable crystallographic characteristics under severe aging conditions, high and stable porosity with high and selective mercury intrusion volumes, with high redox activity at lower temperatures and with low mass transfer resistance and high dynamic oxygen storage and release characteristics.

To make the catalyst or catalyst support, these cerium and zirconium mixed oxide powder is mixed with a refractory inorganic oxide, such as aluminium oxide, silicon oxide or titanium oxide, in water to form a powder slurry. Subsequently, precious metals, such as palladium, rhodium or platinum, and other additives, such as stabilizers, promoters and binders are added to the oxide slurry to obtain a washcoat. This washcoat slurry may then be coated onto a carrier, such as a ceramic monolithic honeycomb structure to prepare a catalyst for automobile exhaust gas purification.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the compositions and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A process of producing a composition comprising zirconium, cerium, optionally yttrium, and optionally one or more rare earths other than cerium and yttrium, comprising the steps of:

(a) mixing Zr and Ce solutions, optional yttrium solution, and optional solutions of one or more rare earth other than cerium and yttrium to provide a mixture;

(b) adding the mixture to a basic solution to form a precipitate;

(c) dewatering the precipitate;

(d) adding mesitylene to the precipitate, wherein the mesitylene is added in an amount of approximately 50-100% by weight with respect to total oxide content equivalent in the precipitate;

(e) supercritically drying the precipitate; and (f) calcining the precipitate to provide a composition comprising zirconium, cerium, optionally yttrium and optionally one or more rare earths other than cerium and yttrium.

2. The process of claim 1, wherein the composition has (i) a total mercury intrusion volume of from about 1.6 to about 4.0 cc/g after calcination at 1000 degrees Celsius for 10 hours, and (ii) a surface area of about 50 $m^2$/g to about 100 $m^2$/g after calcination at 1000 degrees Celsius for a period of 10 hours in an oxidizing environment.

3. The process of claim 2, wherein the composition has a total mercury intrusion volume of from about 2.0 to about 3.5 co/g after calcination at 1000 degrees Celsius for 10 hours and a total mercury intrusion volume of from about 1.0 to about 2.0 cc/g after calcination at 1100 degrees Celsius for 10 hours; and a surface area of about 50 $m^2$/g to about 70 $m^2$/g after calcination at 1000 degrees Celsius for a period of 10 hours in an oxidizing environment and about 20 $m^2$/g to about 35 $m^2$/g after calcination at 1100 degrees Celsius for a period of 10 hours in an oxidizing environment.

4. The process of claim 1, wherein the supercritical drying is conducted at approximately 250-350° C. and approximately 130-140 bar.

5. The process of claim 1, wherein the calcining is conducted at a temperature ranging from about 400° C. to 1100° C. and for from about 0.25 to 24 hours.

6. The process of claim 5, wherein the calcining is conducted at a temperature of about 850° C. to 1000° C. and for about 3 to 7 hours.

7. The process of claim 1, wherein the composition comprising zirconium, cerium, optionally one or more rare earths other than cerium, and optionally yttrium has an increased mercury intrusion volume between of 1 and 3 μm pore entrance diameter (inclusive) in comparison to a composition made by a process without mesitylene.

8. The process of claim 1, wherein the composition comprising zirconium, cerium, optionally one or more rare earths other than cerium, and optionally yttrium has a total mercury intrusion volume of about 15% to about 70% greater after calcination at 1000 degrees Celsius for 10 hours in an oxidizing environment in comparison to compositions made by the same process not utilizing mesitylene.

9. The process of claim 1, wherein the composition comprising zirconium, cerium, optionally one or more rare earths other than cerium, and optionally yttrium has a total mercury intrusion volume of about 8% to about 45% greater after calcination at 1100 degrees Celsius for 10 hours in an oxidizing environment in comparison to compositions made by the same process not utilizing mesitylene.

10. The process of claim 1, wherein the composition comprising zirconium, cerium, optionally one or more rare earths other than cerium, and optionally yttrium has a surface area of about 5% to 25% greater after calcination at 1000 degrees Celsius for a period of 10 hours in an oxidizing environment in comparison to compositions made by the same process not utilizing mesitylene.

11. The process of claim 1, wherein the composition comprising zirconium, cerium, optionally one or more rare earths other than cerium, and optionally yttrium has a surface area of about 5% to 25% greater after calcination at 1100 degrees Celsius for a period of 10 hours in an oxidizing environment in comparison to compositions made by the same process not utilizing mesitylene.

* * * * *